United States Patent [19]

Fletcher et al.

[11] 4,052,614

[45] Oct. 4, 1977

[54] PHOTOELECTRON SPECTROMETER WITH MEANS FOR STABILIZING SAMPLE SURFACE POTENTIAL

[76] Inventors: James C. Fletcher, Administrator of the National Aeronautics and Space Administration, with respect to an invention of; Frank J. Grunthaner; Blair F. Lewis, both of Pasadena, Calif.

[21] Appl. No.: 675,351

[22] Filed: Apr. 9, 1976

[51] Int. Cl.[2] .................... G01M 23/00

[52] U.S. Cl. .................... 250/310; 250/398

[58] Field of Search .................... 250/305, 306, 309, 310, 250/391, 398

[56] References Cited

U.S. PATENT DOCUMENTS 3,535,516 10/1970 Munakata .................... 250/310

*Primary Examiner*—Alfred E. Smith
*Assistant Examiner*—B. C. Anderson
*Attorney, Agent, or Firm*—Monte F. Mott; Paul F. McCaul; John R. Manning

[57] ABSTRACT

An improved X-ray photoelectron spectrometer is disclosed, which includes circuit means to determine the surface potential of a sample, e.g., an insulator. The circuit means comprise an electron gun, whose potential is modulated at a preselected frequency above and below a selected potential with respect to the spectrometer common potential, e.g., ground. The beam of electrons is directed to the sample surface. The sample's surface potential is offset by an offset power supply with respect to the spectrometer common potential until the AC current which flows through the sample reaches a peak amplitude. A lock-in amplifier is included to measure the AC current in phase with the modulating frequency.

16 Claims, 6 Drawing Figures

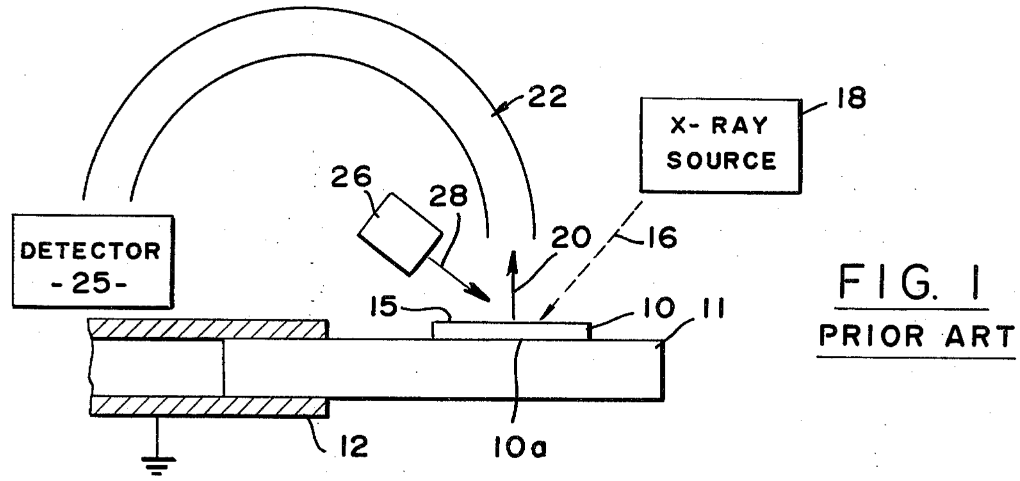
FIG. 1
PRIOR ART
FIG. 2
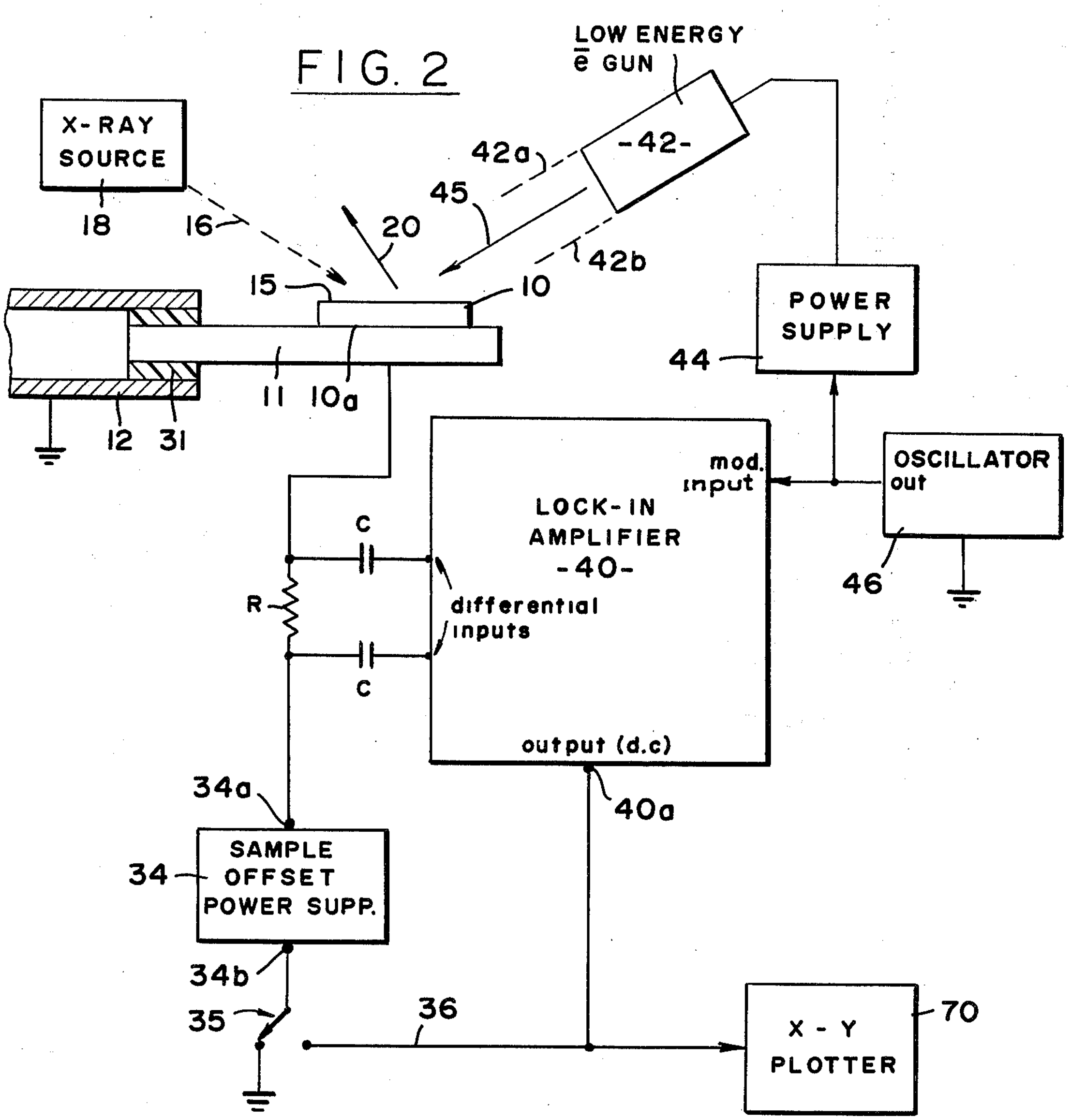

PHOTOELECTRON SPECTROMETER WITH MEANS FOR STABILIZING SAMPLE SURFACE POTENTIAL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention generally relates to electron spectroscopy and, more particularly, to improvements in X-ray photoelectron spectroscopy.

2. Description of the Prior Art

Electron spectroscopy for chemical analysis (ESCA) has become a useful technique to study surface phenomena. Basically, in an ESCA spectrometer, kinetic energies of electrons, which were ejected from the surface of a sample, are measured. Based on those measurements it is possible to determine what atoms are present at the sample surface and their relative abundance. Also, by observing small shifts in the energies of the emitted electrons, compared to their total energies, one can derive information regarding the chemical environment of the atoms, i.e., what their neighboring atoms are and how they are bonded to these neighboring atoms.

One ESCA spectrometer, which is available commercially from Hewlett-Packard Co. of Palo Alto, California is an X-ray ESCA spectrometer. In it, photons from an X-ray source are directed and bombard the sample surface. Due to the photon energy which is absorbed by the sample surface, photoelectrons hereinafter simply referred to as electrons, are ejected from the sample surface. These electrons are passed through an analyzer and therefrom to a detector. The Hewlett-Packard (HP) X-ray ESCA spectrometer is well known by those familiar with the art. This model is described in the "Hewlett-Packard Journal", July 1973, which is published by the manufacturer.

In the photoelectron spectrometer, since the measurements are made of the kinetic energies of the electrons as they leave the sample surface, in order to properly interpret the measurements or data, it is necessary to know the vacuum level of the sample, i.e., the sample work function and its surface potential, with respect to some reference, such as system common. Assuming that the sample's work function is constant, the sample's surface potential need be known.

When studying the surface phenomena of a good conductor, such as a metal or semiconductor for all practical purposes the surface potential of the sample is the same as the sample's bulk potential. Thus, by connecting the back side of the sample bulk to the system common the surface potential is actually the same as that of the system common, i.e., is known. Therefore, the measurements of the energies of the ejected electrons can be interpreted properly. However, when studying the surface chemistry of an insulator, by connecting the insulator back side to the system common the insulator's surface potential is not known, since in an insulator its surface potential may differ significantly from the insulator bulk potential.

The problems, presented by the surface potential of an insulator, in studying the surface chemistry of insulators have been appreciated in the prior art. In the "Hewlett-Packard Journal" of July 1973, the use of a flood gun is described. The flood gun is intended to supply low-energy electrons to the insulator surface and thereby reduce the positive surface potential which is created when the surface is struck by the X-ray photons, which cause the electrons to be ejected.

Although the use of the flood gun as described in the prior art may provide some advantages, it is not satisfactory when precise measurements are required, including the need for observations of small energy shifts. With the flood gun it is not possible to determine the actual insulator's surface potential or relate it to a known potential. Thus, all measurements cannot be made as precisely as desirable. Furthermore, small shifts in electron energies cannot be interpreted, to provide accurate information relating to atoms neighboring those from which the electrons are ejected. Other disadvantages of the use of the floor gun as proposed in the prior art will be discussed hereinafter.

OBJECTS AND SUMMARY OF THE INVENTION

It is a primary object of the present invention to provide improvements in an ESCA spectrometer.

Another object of the present invention is to provide a spectrometer of the electron spectroscopy for chemical analysis type in which the surface potential of a sample under analysis is precisely determinable with respect to a known reference potential in the spectrometer.

These and other objects of the present invention are achieved by exposing the sample surface to a beam of low energy electrons from an electron gun. The electron gun potential is modulated about a fixed potential by a reference oscillation and a component of beam current passing through the sample is detected by phase-sensitive techniques. The sample surface potential is varied relative to the potential applied to the electron gun so that during the taking of measurements or data the sample's vacuum level is maintained to be equal to the vacuum level of the element in the gun from which the electrons are emitted, such as a filament or a cathode. The work function of the electron-emitting element is known and for all practical purposes it does not change during an experiment. And since the gun potential is known the vacuum level of the gun's electron-emitting element, hereinafter simply referred to as the gun's vacuum level, is known very precisely. Since the sample's vacuum level is maintained to equal the gun's vacuum level, knowing the sample's work function which is assumed to remain constant during the experiment, the sample's surface potential is known to a high degree of accuracy.

The novel features of the invention are set forth with particularity in the appended claims. The invention will best be understood from the following description when read in conjunction with the accompanying drawings.

BRIEF DESCRIPTION OF THE DRAWINGS

FIG. 1 is a simple diagram of a prior art photoelectron spectrometer;

FIG. 2 is a partial cross-sectional and block diagram of a photoelectron spectrometer, highlighting the present invention;

DESCRIPTION OF THE PREFERRED EMBODIMENTS

Figure 3:
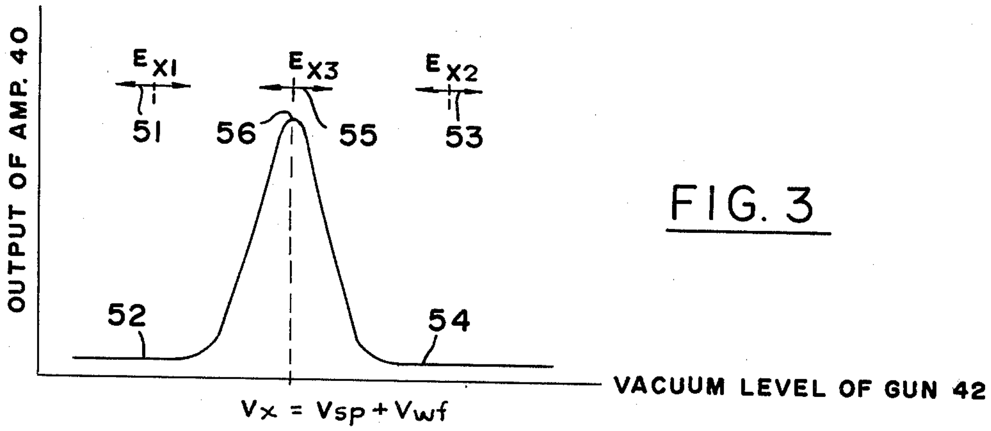
FIGS. 3 and 4 are curves useful in explaining the invention.

In order to best explain the present invention and highlight its advantages, a prior art ESCA spectrometer, such as the HP 5905A ESCA spectrometer, described in the above-referred to Journal will be described in connection with FIG. 1. Therein, the sample, whose surface is to be analyzed, is designated by 10 and is shown mounted on its back side 10*a* on a slideable rod 11. The latter is supported by and in electrical contact with spectrometer structure 12 which is assumed to be at the system common, e.g., ground. Thus, the rod 11 as well as the sample back side are at ground potential.

Directed to the sample top surface 15 are photons 16 from an X-ray source 18. Due to the photon energy absorbed at surface 15 electrons 20 are ejected. Through proper focusing means (not shown) the ejected electrons 20 enter an electron energy analyzer 22, in the form of two hemispherical domes. As is known, by varying the voltage between the analyzer domes electrons in a desired energy range follow a circular path between the domes and reach detector 25, while electrons outside the desired energy range strike one of the domes and do not reach the detector.

As is appreciated when the sample 10 is a good electrical conductor, e.g., a metal or semiconductor, the potential at surface 15 is the same as the sample bulk potential, such as the back side 10*a.* Thus, for all practical purposes the surface potential is at ground. In such a case, since the surface potential is known, and the sample's work function is assumed constant the sample's vacuum level is known. Thus, the measurements can be properly and accurately interpreted.

However, when the sample is an insulator, a potential difference may be present between its top surface 15 and its bulk. In the ESCA X-ray spectrometer when studying the surface phenomena of an insulator, the photon energy absorbed by the surface 15 cause the electrons 20 to be ejected therefrom thereby causing the surface to become positively charged with respect to its bulk, which is at ground. Consequently, the sample surface potential is not known, and therefore the measurements or data cannot be properly interpreted.

The problem was recognized in the prior art. It was proposed to include in the ESCA spectrometer, a flood gun 26, whose function is to direct low energy electrons 28 to surface 15 and thereby reduce the positive charge built up on the surface 15. In the Hewlett-Packard Journal such a flood gun and its effects are described on pages 10 and 11.

It has been discovered however that the use of the flood gun, as proposed by the prior art, often is not satisfactory for accurate measurements, particularly where small energy shifts are of interest. Although the flood gun may reduce the positive charge on the surface 15, the actual surface potential is still not known. Also, there is a danger that with the flood gun and the presence of secondary electrons the surface 15 may actually be charged to a negative potential, with respect to the flood gun and thus repel the electrons 28 from reaching the surface. Also another major disadvantage of the use of the flood gun as hereinbefore proposed, relates to the energies of the electrons 28, provided by the gun 26. Typically, the kinetic energy of the electrons 28 is on the order of 1 volt or more. Such high electron energies can cause chemical reactions to occur at the sample surface, faster than the surface can be stabilized. Such chemical reaction may change the work function of the sample and introduce other offsets which may affect the surface characteristics. This is of course most undesirable. Thus, the prior art X-ray photoelectron spectrometer, even with a flood gun to be used as hereinbefore suggested, are inadequate for the accurate study of insulators.

In accordance with the present invention the prior art X-ray photoelectron spectrometer is modified and means are added to enable very accurate studies of insulator surface phenomena. In a preferred embodiment of the invention, which will be described hereinafter in detail, the potential on the back side of the sample is varied so as to maintain the sample's vacuum level equal to a known vacuum level. With the sample'work function reasonably assumed to remain constant, the sample's surface potential is known very precisely on a real time basis.

Attention is now directed to FIG. 2 in connection with which the preferred embodiment of the invention will be described. In FIG. 2, sample 10 is assumed to be an insulator, although as will be appreciated from the following description, the photoelectron spectrometer, as modified, may be used to study conductors and semiconductors as well. Unlike the prior art spectrometer, in the spectrometer of the present invention the sample support rod 11 is electrically insulated by an insulating ring 31 from the spectrometer structure 12, which is assumed to be at ground. Thus, the rod 11 and the sample back side 10*a* or sample bulk are not necessarily at ground.

The sample back side 10*a,* which is at the same potential as the rod 11, is connected through the rod to a terminal 34*a* of a sample offset DC power supply 34, through a resistor R. The other terminal 34*b* of power supply 34 is shown connected to the movable arm of a two-position switch 35. Briefly, the function of this switch is to connect the power supply terminal 34*b* to either ground (as shown) or to a line 36 which is connected to the DC output terminal 40*a* of a lock-in amplifier 40. As will be explained later, the function of line 36 is to provide a feedback path from the amplifier 40 to the power supply 34.

One example of a lock-in amplifier 40, which was actually used in reducing the invention to practice, is Lock-In Amplifier Model 124, available commercially from Princeton Applied Reasearch Corporation of Princeton, New Jersey. The resistor R is connected through capacitors C to the differential inputs of the amplifier 40.

In accordance with the present invention a low energy electron gun 42, which is powered by a power supply 44 is included to provide low energy electrons 45 to the sample surface 15. The power supply 44 is connected to ground through an oscillator 46, which effectively modulates the power supplied to the electron gun 42 by a small potential change at a selected frequency, e.g., 10KHz. The voltage provided by power supply 44 may be defined as $E_X$, and is generally on the order of several volts, e.g., 5 volts, while the peak to peak voltage of oscillator 46 may be on the order of 1 volt. As shown the output of oscillator 46 is also connected to the modulation input of the lock-in amplifier 40.

As is appreciated by modulating the power supply 44 with oscillator 46 the energy of electrons 45 is modulated at the oscillator frequency. If the energy of electrons 45 approaching surface 15 is below a threshold energy which is equal to the sample vacuum level, and therefore closely related to the surface potential (assuming the sample work function to be constant) such electrons will be repelled from the surface 15 and will not be absorbed thereby. On the other hand, if the energy of the electrons 45 is above the threshold energy the electrons 45 will be captured by the sample surface.

Attention is now directed to FIG. 3 in connection with which the effect of the electrons 45 on the sample will be discussed. As is appreciated the insulator sample can be thought of as a capacitor with its top surface 15 and back side 10*a* representing the capacitor's opposite plates. In FIG. 3, $V_X$ designates the sample's vacuum level which is equal to the sample's surface potential $V_{sp}$ plus the sample's work function, designated $V_{wf}$.

FIG. 3 is a diagram of the DC output of the amplifier 40 at terminal 40*a* as a function of the AC current flowing in resistor R. As shown in FIG. 2 the resistor R is connected across the differential inputs of amplifier 40. It is the voltage drop across R which is applied to the amplifier 40. However, since the voltage drop is proportional to the current through R, the amplifier 40 can be viewed as an AC current detector. It detects the AC current in synchronism or phase with the modulation of the gun potential, provided by oscillator 46, whose output is supplied to the amplifier 40, as shown in FIG. 2.

Let it be assumed that the gun potential provided by 44 is $E_{X1}$ and is modulated by oscillator 46, as represented by 51. When the gun's vacuum level with the modulated gun potential as represented by 51, is considerably below $V_X$ few if any electrons are captured by the sample, and therefore the AC current through resistor R is practically zero and the amplifier output is accordingly zero or very low, as represented by 52. Similarly, when the gun's vacuum level with the gun potential, provided by power supply 44 is $E_{X2}$ and is modulated by oscillator 46, as represented by 53, is considerably above $V_X$, the absorbed electrons merely charge up the capacitor, i.e., the sample. However, the AC current is very low (substantially zero) and therefore the amplifier output is low as represented by 54. However, when the gun potential provided by power supply 44 is $E_{X3}$ and is modulated by oscillator 46 so that the gun vacuum level varies above and below $V_X$, as represented by 55, the charge across the sample remains substantially constant. However, due to the absorbed electrons 45 the AC current through the resistor reaches a maximum amplitude when the gun vacuum level equals $V_X$, i.e., the sample vacuum level. When the AC current reaches a maximum amplitude the output of the amplifier reaches a peak value, as represented by 56.

Figure 4:
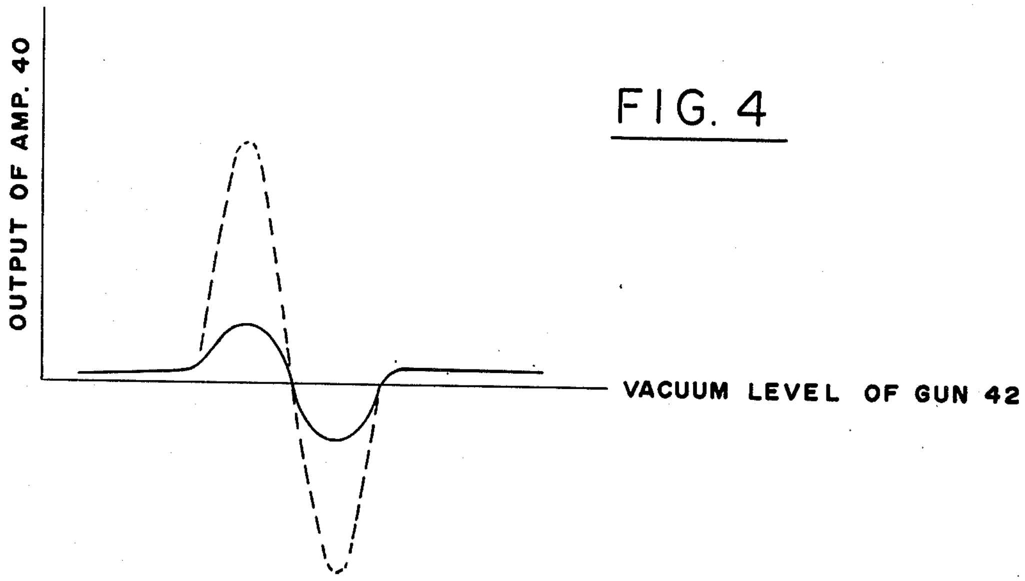

As is appreciated by those familiar with the art the lock-in amplifier may be operated to provide the derivative of the output shown in FIG. 3. That is, it may be operated to provide a DC output at terminal 40*a* which crosses zero when the AC current peaks. Such an output is represented in FIG. 4. By controlling the gain in the lock-in amplifier 40 the actual output magnitude as a function of AC current change may be varied. However, regardless of the gain the crossover point will occur when the AC current amplitude is a maximum.

Let is be assumed that the amplifier 40 is operated to provide the output as shown in FIG. 4 and let it further be assumed that resistor R, instead of being connected to power supply 34, is connected directly to ground. It should be apparent that if one varies $E_X$, i.e., the voltage provided by the gun power supply 44 when the amplifier output crosses zero, $E_X$ plus the gun's work function, i.e., the gun's vacuum level would be equal to the sample vacuum level $V_X$. Since the gun's work function, $E_X$ and the sample's work function are known, the surface potential $V_{sp}$ can be accurately determined. In the embodiment of the invention, however, instead of varying $E_X$ it is held at a constant voltage and the sample offset power supply 34 is incorporated. It is used to shift the sample surface potential with respect to ground until the amplifier output crosses zero while the voltage $E_X$ from power supply 44, which is modulated by oscillator 46, is fixed, i.e., is at a constant voltage. Thus, the offset power supply 34 is used to adjust the sample's surface potential so that the sample's vacuum level $V_X$ is made equal to the gun's vacuum level.

In normal operation prior to taking any measurements or data the switch 35 (FIG. 2) is in the position as shown. The voltage $E_X$ is chosen at several volts and is not changed. After the insulator sample is loaded and the X-ray source 18 is operated long enough to reach a stable condition, the voltage provided by sample offset power supply 34 is gradually varied until the DC output of amplifier 40 crosses zero. At this point in time, $V_X$, i.e., the sample vacuum level is equal to the gun's vacuum level which equals the gun's potential $E_X$ with respect to ground (or system common) plus the gun's work function. Since it is reasonable to assume that the gun 42 is stable both chemically and physically, it is thus seen that in the present invention the electron gun power supply is used as a reference to determine quite precisely the vacuum level $V_X$. And, since the sample work function is assumed to be constant, once the sample vacuum level is precisely determined the sample surface potential can be determined to a high degree of precision.

Generally, when the power supply 34 is adjusted and the DC output of amplifier 40 crosses zero, switch 35 is switched to its position in which line 36 is connected to terminal 34*b* of power supply 34, and actual measurements are taken of the ejected electrons 20. Through line 36 the amplifier 40 provides a feedback signal to the sample offset power supply in order to vary the offset voltage applied to the sample and thereby maintain the output of amplifier 40 at the zero crossover point, i.e., maintain the sample's vacuum level to equal the gun's vacuum level.

From the foregoing it should thus be appreciated that in the present invention the electron gun 42 is not merely used to provide electrons to discharge the positive charge, which is built up on the surface 15 due to the ejected electrons 20, as is the case in the prior art. Rather, in the present invention the gun 42 together with its modulated power source (power supply 44 and oscillator 46), the lock-in amplifier 40 and the sample offset power supply 34 are used to precisely determine the surface potential $V_{sp}$ at the start of actual measurements (or data taking) and maintain this potential constant during the taking of data. This is achieved by using the gun's vacuum level which is a function of the known electron gun potential as a reference to which the sample vacuum level is adjusted by adjusting its surface potential since its work function is assumed to remain constant during an experiment.

It should be pointed out that since in the present invention the sample vacuum level is effectively maintained at the gun vacuum level, except for the gun potential modulation, the electrons 45 which are captured by the sample surface arrive with virtually zero kinetic energy. Consequently, they do little if any chemical damage to the surface. This is most significant since in ESCA spectrometry the surface chemistry is the aspect which is studied. As previously pointed out in the prior art this is not the case. Therein, the kinetic energy of the flood gun electrons 28 is generally on the order of +1 or more volts. Consequently, the electrons may and often do damage the sample surface chemistry. In practice in the present invention the energy of the electrons 45 arriving at the surface is not zero since the electrons from the gun 42 are not monoenergetic. Their energies are on the order of a few tenths of a volt, e.g., 0.2v. However, their energy is low enough so as to prevent damaging the sample surface. If desired the electrons 45 may be passed to surface 15 through an electrostatic energy analyzer, represented in FIG. 2 by dashed lines 42*a* and 42*b* in order to reduce the energy of the electrons 45 reaching surface 15 to a few tens of millivolts and thereby practically eliminate any likelihood of chemical damage to the surface 15 by the electrons 45.

Figure 5:
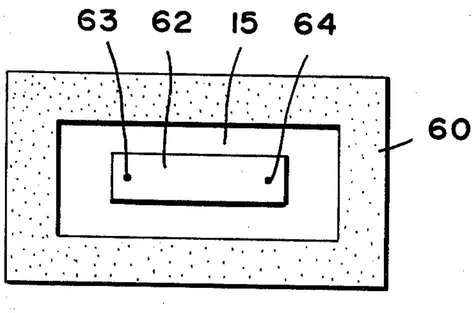
FIG. 5 is a top view of a sample used to explain the use of a scannable electron gun in accordance with the present invention.

Attention is now directed to FIG. 5 which is a top view of the sample 10. In practice, the sample 10 is clamped to the rod 11 by a holder with a mask of appropriate metal, e.g., gold, which masks most of the surface 15 except for the surface area exposed to the photons 16 from the X-ray source 18 and a small area around the photon-exposed area. In FIG. 5 the mask is designated by 60 and the surface area exposed to the X-ray photons by 62. The latter's dimensions are generally on the order of 2–3 mm by about 1mm while the total exposed surface 15 is generally on the order of 4mm by 1.5mm.

It is generally desirable that the beam of the low energy electrons 45 from gun 42 be dimensioned to expose only the X-ray exposed area 62, from which electrons 20 are ejected. This may be accomplished by incorporating electron optical means between gun 42 and surface 15 so as to properly shape the electron beam dimensions.

In one embodiment of the invention which was actually reduced to practice the gun 42 is one in which the beam of electrons emitted therefrom is scannable in two (X and Y) axes. In the particular embodiment the scannable electron gun 42 consists of a commercially available vidicon tube, e.g., EMI-D2003 which was converted into an electron gun by removing the photocathode target therefrom. The beam dimensions at the surface 15 are on the order of less than 0.1mm by less than 0.1mm.

It should be pointed out that for accurately determining the surface potential, as hereinbefore described, the entire surface area 62 which is exposed to the X-ray photons should be exposed to the low-energy electrons from the scannable electron gun 42. If the electron beam size is smaller than area 62 the electron beam should be scanned over area 62 at a sufficiently high rate so as to provide relatively constant and uniform exposure of surface area to the low-energy electrons.

As is appreciated by those familiar with the art, if the surface potential is uniform over the entire surface area which is exposed to the X-ray photons, the intrinsic lines in the X-ray photoelectron spectrum are quite narrow. However, if there is a distribution of surface potential over the X-ray exposed surface area the lines in the spectrum broaden. Such line broadening reduces the ability to determine what small shifts in the lines mean chemically, i.e., what are the atoms neighboring those from which electrons were ejected, and how these atoms are bonded together. Thus, it is desirable to be able to determine and measure variations in the surface potential of the X-ray exposed surface area 62. This is achievable with the present invention in which the gun 42 is a scannable electron gun. With present state of the art techniques an electron beam size on the order of tens of microns, e.g., 10$\mu$ is attainable. Since the X-ray exposed area is on the order of several square mm, the small electron beam from gun 42 can be successively focused at different spots of the X-ray exposed surface to determine the surface potentials at these spots from which variations in surface potentials may be ascertained.

This may be accomplished with the present invention as follows. With switch 35 in the position as shown in FIG. 2 and amplifier 40 assumed to be operated to produce a DC output as a function of AC current as shown in FIG. 3 the beam from gun 42 is focused at a first spot, such as that marked by 63 in FIG. 5 in area 62. Then, the power supply 34 (or power supply 44) is adjusted, i.e., its output voltage is varied until the amplifier output peaks, as shown in FIG. 3. Thereafter, the beam from gun 42 is focused at a different spot, e.g., spot 64 and power supply 34 is again adjusted until the output of amplifier 40 peaks. The difference in the voltages provided by power supply 34 for producing a peak output from amplifier 40 when the beam is at spots 63 and 64 is a measure of the difference in the surface potential at spots 63 and 64.

It should be apparent that the same can be achieved by maintaining the voltage output of power supply 34 constant and varying the voltage of the gun power supply 44. It should also be apparent that the same may be accomplished with the amplifier operated to provide an output as a function of the AC current amplitude as shown in FIG. 4. In such a case the crossover points in the amplifier output rather than the peaks are looked for. If desired, the amplifier output may by plotted by an X-Y plotter, represented in FIG. 2 by 70 for each spot at which the electron beam from gun 42 is focused, as the output voltage from power supply 34 (or power supply 44) is varied to produce a visual plot for each spot.

The advantages of being able to determine differences in the surface potentials at closely located spots on a surface of a sample are not limited to X-ray spectrometry. It can be used to a great advantage in analyzing the performance of integrated circuits by determining the differences in the surface potentials at different junctions of the circuit. Such information is useful in analyzing the performance of the integrated circuit.

Figure 6:
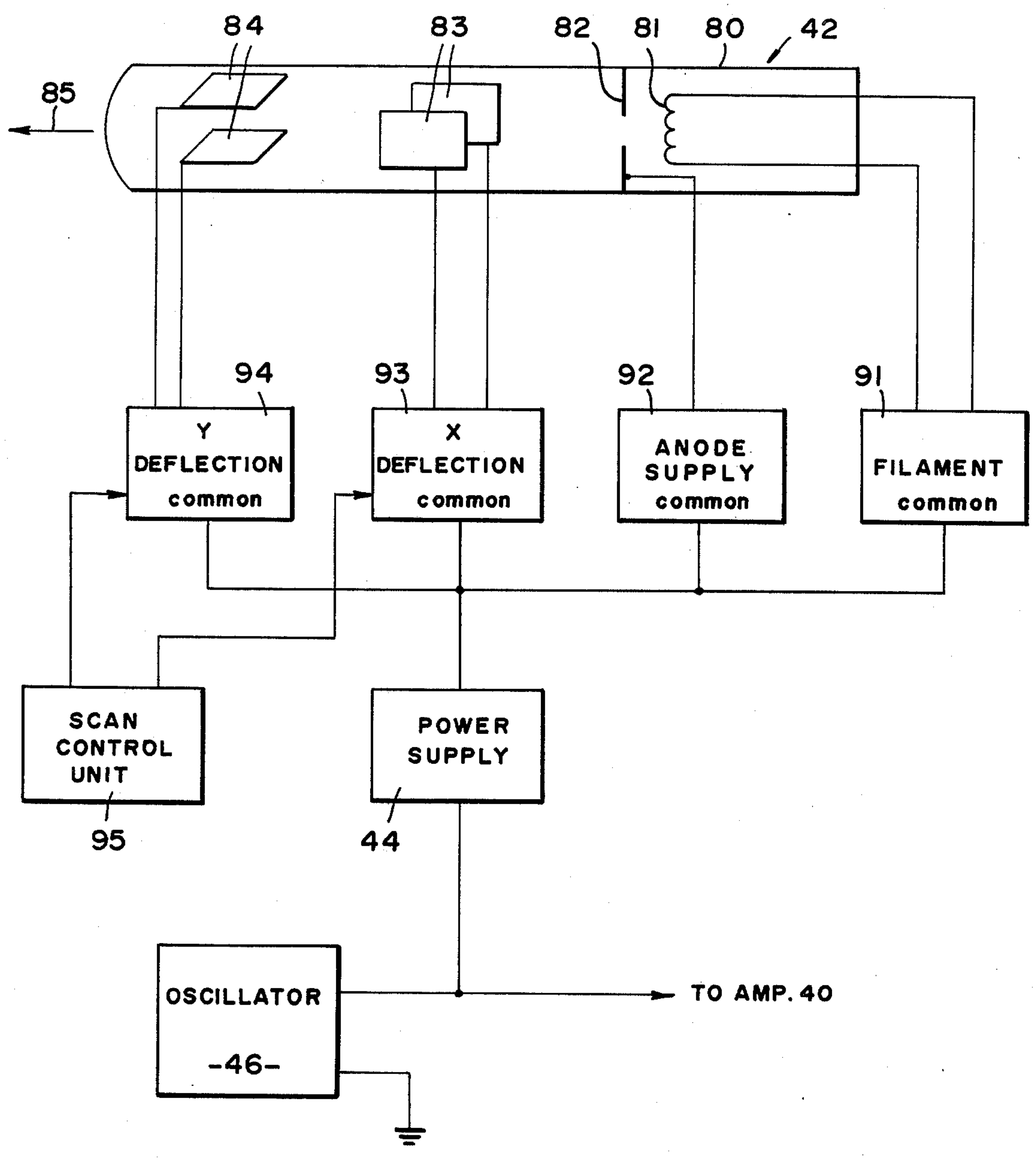
FIG. 6 is a simplified diagram of primarily a scannable electron gun with its power sources.

Based on the foregoing description it should be apparent that different circuit arrangements may be employed to provide electron gun 42 to operate as a scannable gun. One simplified diagram is shown in FIG. 6. Therein the gun 42 is shown comprising an evacuated envelope 80 in which filaments 81, apertured anode 82, X deflection plates 83 and Y deflection plates 84 are enclosed. The scannable electron beam is represented by 85. The common terminals of the power supplies 91, 92, 93 and 94 for the filament anode, the X deflection plates and the Y deflection plates respectively are connected to the positive terminal of power supply 44 which is modulated by the output of oscillator 46. The deflection plates' power supplies 93 and 94 are controlled to a scan control unit 95 which effectively controls the potentials provided by 93 and 94 and thereby controls the scanning of beam 85.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a spectrometer system of the photoelectron spectroscopy for chemical analysis type in which the surface characteristics of a sample in said spectrometer are analyzed as a function of electrons ejected from said sample surface due to energy absorbed by said sample surface from a selected source, the spectrometer including circuitry operated by potentials referenced to a potential reference, definable as system common, to which the spectrometer structure is converted, the improvement comprising:

support means for supporting thereon a sample whose surface is to be analyzed;

electrical insulating means mechanically coupling said support means to said spectrometer structure and for permanently electrically insulating said support means from said system common through said spectrometer structure;

energy means for directing energy to the sample surface to cause electrons to be ejected therefrom;

a modulated power source means for providing a potential with respect to said system common, which is variable at a preselected modulating frequency;

electron source means powered by said power source for directing low energy electrons to said sample surface; and circuit means for determining the amplitude of an AC current produced through said sample as a function of the electrons from said electron source means absorbed by the sample surface and for offsetting the surface potential of said sample so that said AC current is at a peak amplitude.

2. The improvement as described in claim 1 wherein said modulated power source includes a DC supply connected to said electron source means and an oscillator connected to said DC power supply for providing an output at said preselected frequency to modulate the potential applied to said electron source means at said modulating frequency above and below the DC voltage provided by said DC power supply.

3. The improvement as described in claim 1 wherein said circuit means include a lock-in amplifier for providing an output signal indicative of the AC current amplitude.

4. The improvement as described in claim 1 wherein said circuit means include a resistor connected to said support means to which the back side of said sample, opposite the surface thereof, is physically and electrically connected, with said AC current flowing through said resistor, and measuring means coupled to said resistor and to said modulated power source means for measuring the AC current through said resistor in phase with the preselected modulating frequency and for providing an output indicative of the AC current amplitude.

5. The improvement as described in claim 4 wherein said measuring means is a lock-in amplifier with a pair of differential input terminals coupled across said resistor, an output terminal at which the output indicative of the AC current amplitude is provided, and a modulation input, and means for applying the preselected modulating frequency to said modulation input.

6. The improvement as described in claim 5 wherein said modulated power source includes a DC power supply connected to said electron source means and an oscillator for providing an output at said preselected frequency to modulate the potential applied to said electron source means at said modulating frequency above and below the DC voltage provided by said DC power supply, and means for applying the output of said oscillator to the modulation input of said lock-in amplifier.

7. The improvement as described in claim 5 further including a variable DC sample offset voltage source having a first terminal, connected to one end of said resistor with the other resistor end connected to said support means, said offset voltage source having a second terminal selectively connectable to either said system common or to the output terminal of said lock-in amplifier.

8. The improvement as described in claim 7 wherein said modulated power source includes a DC power supply connected to said electron source means and an oscillator for providing an output at said preselected frequency to modulate the potential applied to said electron source means at said modulating frequency above and below the DC voltage provided by said DC power supply and means for applying the output of said oscillator to the modulation input of said lock-in amplifier, with said sample offset voltage source being variable to vary DC offset voltage applied to said sample with respect to said system common, and further including a two position switch connected to the second terminal of said offset voltage source, for connecting said second terminal to said system common in a first position of said switch and to the lock-in amplifier output terminal in a second position of said switch.

9. The improvement as described in claim 8 wherein said electron source means is a scannable electron gun, with the beam of electrons from said gun being selectively scannable with respect to the sample surface so as to direct the beam to selected portions of said surface.

10. In a spectrometer of the type including a source of photons directed to a sample whose surface characteristics are to be analyzed, with the photons absorbed by the surface causing electrons to be ejected and means for receiving and detecting said electrons, the spectrometer circuitry including potential sources referenced to a common potential definable as system common, with the spectrometer structure being connected to said system common, the improvement comprising:

sample support means for supporting the sample thereon;

electrical insulating means for mechanically coupling said support means to said spectrometer structure, and for permanently electrically insulating said support means from said system common through said spectrometer structure;

power source means including a first DC voltage power supply adapted to supply a selected voltage and oscillator means coupled to said first DC power supply for providing an output signal at a preselected modulating frequency, whereby the DC voltage provided by said first power supply is modulated above and below a selected voltage with respect to system common;

electron source means connected to and powered by said first power supply for providing low energy electrons directed to the sample surface;

a second DC power supply, controllable to supply a variably selected voltage across first and second terminals thereof, a resistor connected at one end to said support means and at an opposite end to the first terminal of said second power supply;

a lock-in amplifier having differential input terminal means, a modulation input terminal and an output terminal;

means for connecting said resistor to said differential input terminal means of said lock-in amplifier to thereby apply AC voltage across said resistor as a function of AC current flowing through said resistor to said lock-in amplifier, and for connecting the oscillator output signal to the lock-in amplifier modulation input terminal, whereby the amplitude of the output of said lock-in amplifier at said output terminal is indicative of the AC current amplitude through said resistor; and means for selectively connecting said second terminal of said second power supply to said system common or the amplifier output terminal, said second power supply being adjustable to provide a selected voltage with respect to system common to adjust the surface potential of said sample with respect to system common, so that AC current through said resistor is at a peak amplitude.

11. The improvement as described in claim 10 wherein said electron source means is a scannable electron gun, with the beam of electrons from said gun being selectively scannable with respect to the sample surface so as to direct the beam to selected positions of said surface.

12. The improvement as described in claim 10 wherein said source of photons is a source of X-rays and wherein said electron source means is a scannable electron gun, with the beam of electrons from said gun being selectively scannable with respect to the sample surface so as to direct the beam to selected portions of said surface.

13. A method for determining the surface potential of a sample, with respect to a reference potential, the steps comprising:

supporting a sample on the back side thereof, which is opposite a sample surface, on a support member which is not in direct contact with said reference potential;

providing a source of low energy electrons directed to the sample surface;

energizing the source of electrons with a voltage which is modulated above and below a variably selected voltage with respect to said reference potential at a preselected modulating frequency;

measuring the AC current through said sample produced as a result of the electrons from said source which are absorbed by said sample surface to determine the AC current amplitude; and varying a potential with respect to said reference potential, which is applied to the back of said sample to control said AC current to be at a peak amplitude.

14. The improvement as described in claim 13 wherein the source of electrons is an electron gun of the scannable type adapted to provide a beam of electrons selectively directable to any of selected incremental surface areas of said surface and controlling said electron gun to successively direct the beam of electrons to selected incremental surface areas of said sample surface.

15. The improvement as described in claim 13 wherein said AC current is measured in phase with the modulating frequency.

16. The improvement as described in claim 15 wherein the source of electrons is an electron gun of the scannable type adapted to provide a beam of electrons selectively directable to any of selected incremental surface areas of said surface and controlling said electron gun to successively direct the beam of electrons to selected incremental surface areas of said sample surface.

* * * * *